US006940012B2

(12) United States Patent
Case

(10) Patent No.: US 6,940,012 B2
(45) Date of Patent: Sep. 6, 2005

(54) METHOD AND APPARATUS FOR PROVIDING AN ENVIRONMENTAL BARRIER BETWEEN AN INTERIOR AND EXTERIOR OF AN ELECTRICAL ENCLOSURE USING A PLUG AND SEAL

(75) Inventor: Patrick Case, Fresno, CA (US)

(73) Assignee: B-K Lighting, Inc., Madera, CA (US)

( * ) Notice: Subject to any disclaimer, the term of this patent is extended or adjusted under 35 U.S.C. 154(b) by 0 days.

(21) Appl. No.: 10/696,336

(22) Filed: Oct. 28, 2003

(65) Prior Publication Data

US 2005/0087354 A1 Apr. 28, 2005

(51) Int. Cl.⁷ ............................................. H02G 3/08
(52) U.S. Cl. .................. 174/50; 174/58; 174/65 R; 174/60; 220/3.2; 220/3.8; 439/535
(58) Field of Search ...................... 174/50, 17 R, 174/17 CT, 50.5, 50.52, 53, 65 SS, 65 G, 174/152 R, 151, 135, 65 R, 48, 66, 57, 58, 174/64, 60; 220/3.2, 3.3, 3.4, 3.6, 3.7, 3.8, 220/4.02, 724, 730, 517, 518; 361/600, 641; 138/89; 439/535

(56) References Cited

U.S. PATENT DOCUMENTS

| | | | | |
|---|---|---|---|---|
| 2,527,908 A | * | 10/1950 | Blitz ........................... | 174/66 |
| 3,787,606 A | * | 1/1974 | Schaeffer .................. | 174/65 R |
| 3,927,249 A | * | 12/1975 | Pearse ......................... | 174/53 |
| 4,051,322 A | * | 9/1977 | Park et al. ................. | 174/65 R |
| 5,147,979 A | * | 9/1992 | Yang ........................... | 174/48 |
| 5,920,035 A | * | 7/1999 | Haney et al. ............ | 174/152 G |
| 6,180,882 B1 | * | 1/2001 | Dinh ....................... | 174/65 SS |
| 6,323,433 B1 | * | 11/2001 | Mahaney et al. ........ | 174/152 G |
| 6,733,345 B2 | * | 5/2004 | Weise et al. ................... | 174/50 |

FOREIGN PATENT DOCUMENTS

EP 514861 A1 * 11/1992 ............ H02G 3/06

OTHER PUBLICATIONS

Product Datasheet for Part No. 5320-0 From Catalog, pp. 1-2, Single Gang Weatherproof Box 3 1/2 Outlets, Hubbell Electrical Products.

* cited by examiner

Primary Examiner—Dean A. Reichard
Assistant Examiner—Angel R. Estrada
(74) Attorney, Agent, or Firm—Koppel, Jacobs, Patrick & Heybl

(57) ABSTRACT

An electrical fixture is disclosed that has an electrical enclosure, a knockout plug coupled to the electrical enclosure with an interference fit, and a seal coupled to a circumference of the knockout plug between the knockout plug and electrical enclosure so that the seal provides an environmental barrier between an interior and exterior of the electrical enclosure.

A method is also disclosed for providing an environmental barrier for a tapered-threaded knockout of an electrical enclosure including placing a seal on a knockout plug and pressing the knockout plug into the tapered-threaded knockout to establish an interference fit between the knockout plug and tapered-threaded knockout. The knockout plug is detachably coupled to the tapered-threaded knockout, with the seal providing an environmental barrier between interior and exterior portions of the electrical enclosure.

3 Claims, 2 Drawing Sheets

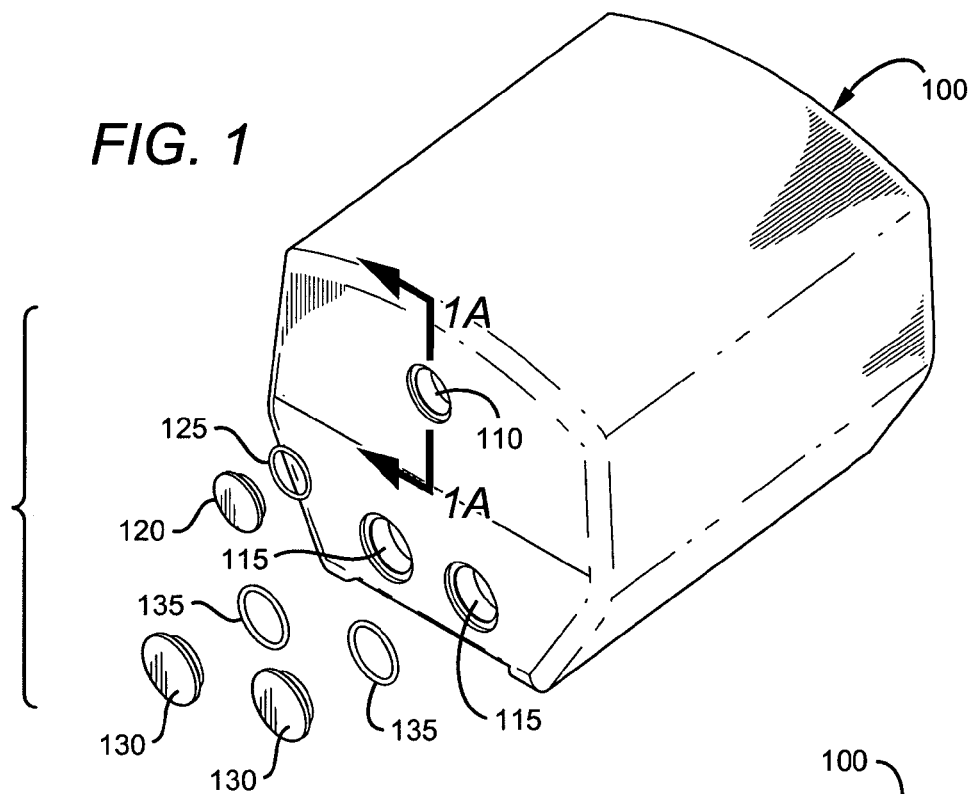
FIG. 1
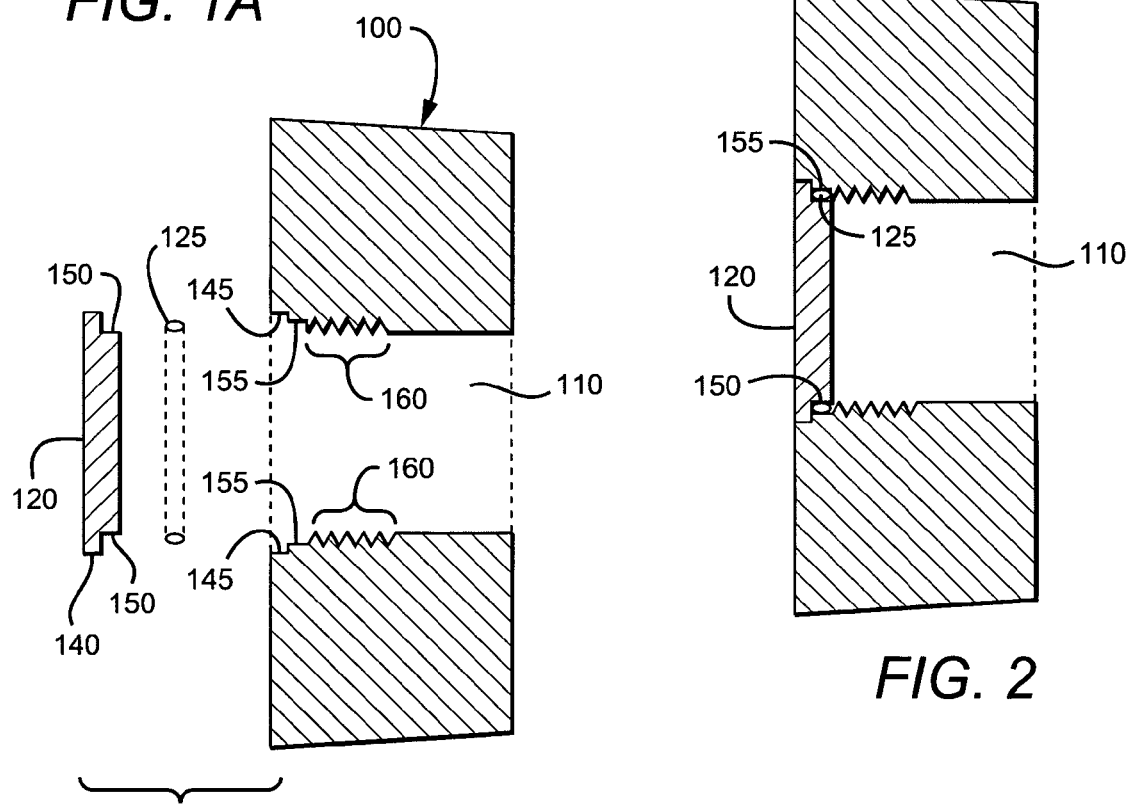
FIG. 1A
FIG. 2

FIG. 3A
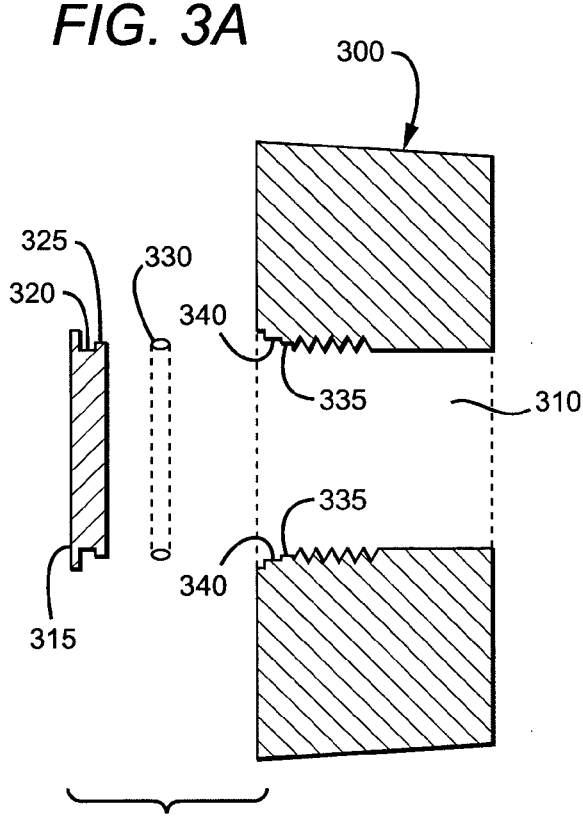
FIG. 3B
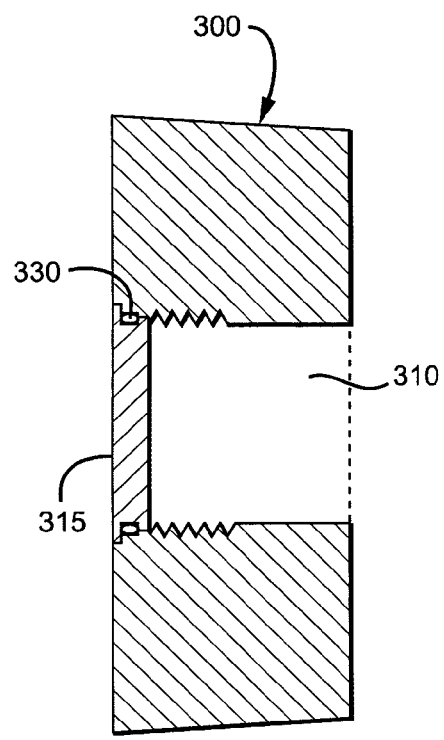
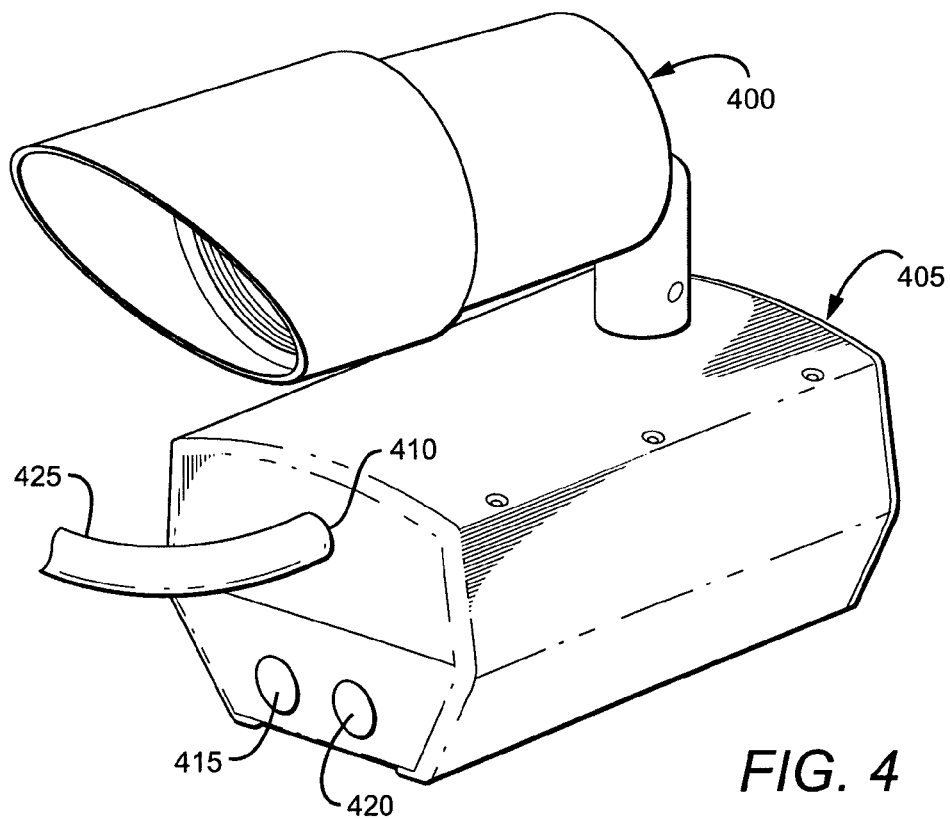
FIG. 4

METHOD AND APPARATUS FOR PROVIDING AN ENVIRONMENTAL BARRIER BETWEEN AN INTERIOR AND EXTERIOR OF AN ELECTRICAL ENCLOSURE USING A PLUG AND SEAL

BACKGROUND OF THE INVENTION

1. Field of the Invention

This invention relates to electrical enclosures, and more particularly to electrical enclosures having knockouts.

2. Description of the Related Art

Outdoor lighting systems are frequently used to provide spotlight and area lighting in locations that are exposed to moisture and particulate contaminants. Electrical enclosures are used in such environments to protect electrical components or electrical junctions used in the lighting systems from damage. One or more knockouts are provided in such enclosures to allow selective introduction of wiring into the interior while maintaining an environmental seal between exterior and interior portions of the electrical enclosure at both utilized and non-utilized knockouts.

Cost and convenience are important design considerations for a knockout. Typically, the knockout is threaded to accept a threaded cap during manufacture, with the cap removed by the user upon assembly of the lighting system. Such a configuration enables conduit or other threaded piping to be attached with a seal at the knockout location while protecting the interior of the electrical enclosure from moisture and contaminants. Unfortunately, use of the knockout is inconvenient because of the need to unscrew the cap.

Or, the knockout can be non-threaded, with its exterior circumference thinned to enable mechanical removal of the desired section such as by striking with a screwdriver or other solid object. A coupling is then added to the enclosure at the knockout to enable a conduit or other threaded piping to be attached with a seal. One example of this configuration includes an electrical enclosure offered by Hubbell Electrical Products, a Division of Hubbell Incorporated (Delaware) (part number 5320-0). The enclosure has a single knockout for introduction of wiring into the enclosure's interior. As is typical for this configuration, the knockout does not provide for a threaded portion to accept a conduit or other pipe thread connections for connection to the electrical enclosure. An additional fitting must be added, with a seal, to couple the conduit or other pipe thread connection to the knockout. Unfortunately, the additional coupling and time required to install the coupling adds to the cost of electrical system installation and is inconvenient for the user.

In either configuration, if multiple knockouts are provided, the non-utilized knockouts remain covered to maintain an environmental seal between exterior and interior portions of the electrical enclosure.

A need exists for an electrical enclosure that provides for selective introduction of wiring into its interior while maintaining an environmental barrier and without adding the expense and inconvenience of removing a threaded cap or adding a coupling prior to assembly.

SUMMARY OF THE INVENTION

An electrical fixture includes, in one embodiment of the invention, an electrical enclosure, a knockout plug coupled to the electrical enclosure with an interference fit and a seal seated on a circumference of the knockout plug so that the seal provides an environment barrier between an interior and exterior of the electrical enclosure.

In one embodiment, a method is disclosed for providing an environmental barrier for a tapered-threaded knockout of an electrical enclosure including placing a seal on a knockout plug and pressing the knockout plug into the tapered-threaded knockout. An interference fit is established between the knockout plug and tapered-threaded knockout so that the knockout plug is detachably coupled to the electrical enclosure. The seal provides an environmental barrier between interior and exterior portions of the electrical enclosure.

An electrical system is also disclosed that has, in one embodiment, an electrical enclosure with a light fixture coupled to it. The electrical enclosure includes a fitting surface that is operable to receive an interference surface of a knockout plug, when a knockout plug is inserted, an enclosure-sealing surface adjacent the fitting surface that is operable to receive a seal, when a seal is inserted on the enclosure-sealing surface, and a pipe-fitting surface disposed approximately coaxial with the enclosure sealing and fitting surfaces. The pipe-fitting surface is complementary to and operable to accept a conduit, when a conduit is inserted past the fitting and enclosure-sealing surfaces.

BRIEF DESCRIPTION OF THE DRAWINGS

The components in the figures are not necessarily to scale, emphasis instead being placed upon illustrating the principals of exemplary embodiments of the invention. Moreover, in the figures, like reference numerals designate corresponding parts throughout the different views.

FIG. 1 is an exploded-perspective view illustrating, in one embodiment of the invention, an electrical enclosure that has three knockouts.

FIG. 1A is an exploded cross-section view of one knockout along line 1A—1A in FIG. 1, that has a knockout plug and seal aligned for an interference fit with the knockout, with the interference fit accomplished at an anterior portion of the knockout plug.

FIG. 2 is a cross-section view of the knockout illustrated in FIG. 1A, with the knockout plug and a seal coupled to the knockout.

FIG. 3A is an exploded cross-section view of, in one embodiment, a knockout plug and seal aligned for an interference fit, with the interference fit accomplished at a posterior portion of the knockout plug.

FIG. 3B is a cross-sectional view of the knockout illustrated in FIG. 3A, with the knockout plug coupled to the knockout and the seal seated between them.

FIG. 4 is a perspective view of an electrical system that has a light fixture, an electrical enclosure, a plurality of knockouts in the electrical enclosure and a conduit detachably coupled to a knockout.

DETAILED DESCRIPTION OF THE INVENTION

An electrical fixture includes, in accordance with one embodiment of the invention, an electrical enclosure, a knockout plug coupled between interior and exterior portions of the electrical enclosure with an interference fit, and a seal seated on a circumference of the knockout plug between the knockout plug and electrical enclosure to provide an environmental barrier between interior and exterior portions of the electrical enclosure. In one embodiment of the invention, a seal is placed on the knockout plug and the knockout plug is pressed into a tapered-threaded knockout of an electrical enclosure to establish an interference fit between the knockout plug and electrical enclosure. The combination of seal, knockout plug and tapered-threaded knockout produces an environmental barrier between interior and exterior portions of the electrical enclosure that may be removed by the user prior to coupling a threaded conduit or pipe thread connection to the tapered-threaded knockout.

FIG. 1 illustrates, in one embodiment, three knockout plugs and their respective seals aligned for coupling to knockouts formed in an electrical enclosure. The electrical enclosure is generally rectangular, square or cylindrical and can be formed from carbon steel, stainless steel, fiberglass, aluminum or a polymeric material. A knockout 110 is provided on one side of the electrical enclosure 100 to allow access from an exterior to interior portions of the electrical enclosure 100. Other knockouts 115 would be provided on the same or other sides if the electrical enclosure 100 is to be connected to more than one component or if desired by the designer of the enclosure. A knockout plug 120 is shown aligned with the knockout 110 with a seal 125 also aligned for seating between the knockout plug 120 and knockout 110. Although the knockout 110 and knockout plug 120 are shown as generally circular, they can be oval, rectangular, or square to accomplish the goals of the designer. Whether circular or formed in another shape, the knockout plug 120 and seal 125 are complementary to the knockout 110. Also, although the seal 125 is illustrated as an O-ring, other seals such as lip seals, cup seals, J and U profiles, wiper skirts or non-elastomeric sealing elements can be used to provide an environmental seal. In the embodiment describing other knockouts 115, respective knockout plugs 130 and seals 135 are illustrated aligned for coupling with the other knockouts 115 to provide an environmental barrier between interior and exterior portions of the electrical enclosure 100.

FIG. 1A shows an exploded cross-section view of the knockout 110 with the knockout plug 120 and seal 125 aligned for coupling in the knockout 110. An interference surface 140 is illustrated on a posterior portion of the knockout plug 120 that is complementary to a fitting surface 145 in the knockout 110. The interference and fitting surfaces (140, 145) form an interference fit when the knockout plug 120 is aligned with and pressed into the knockout 110. The interference surface 140 is either a smooth or rough surface and can be formed around a circumference or a portion of a circumference of the knockout plug 120. A plug-sealing surface 150 is illustrated on an anterior side of the knockout plug 120, with the plug-sealing surface 150 extending around its circumference. The plug-sealing surface 150 is complementary to the seal 125, which in turn is complementary to an enclosure-sealing surface 155 in the knockout 100, to form an environmental barrier at the interfaces of the knockout plug 120, seal 125 and knockout 110 when the knockout plug 120 is coupled to the knockout 110.

A pipe-fitting surface 160 is formed adjacent to and approximately coaxial with the enclosure sealing and fitting surfaces (150, 140) and is either generally smooth or, preferably, a tapered-threaded surface with threads defined by ANSI B2.1-1968 to accept standard light fixtures, wiring conduit or pipe thread connections. If the pipe-fitting surface 160 is generally smooth, a pressure type bushing would be used to couple an exterior fixture, conduit or pipe to the knockout 110.

FIG. 2 is a cross-section view of the knockout plug 120 in an assembled configuration with the electrical enclosure 100 illustrated in FIGS. 1 and 1A. The seal 125 forms an environmental barrier between interior and exterior portions of the electrical enclosure 100 and is seated on the enclosure sealing and plug sealing surfaces (155,150). The plug 120 is detachably coupled to the electrical enclosure 100 with an interference fit between interference and fitting surfaces (140, 145).

FIG. 3A is exploded cross-section view of, in one embodiment, an electrical enclosure 300 that has a knockout 310 and a knockout plug 315. In this embodiment, however, the positions of the plug sealing and interference surfaces (320, 325) are reversed from the positions illustrated in FIGS. 1A and 2, with the plug sealing and interference surfaces (320, 325) on posterior and anterior portions of the plug 315, respectively. A seal 330 is illustrated in alignment with the knockout 310 and knockout plug 315 for assembly. Similar to the embodiment illustrated in FIGS. 1, 1A and 2, the seal 330 can be an o-ring, lip seal, cup seal, J or U profiled seal, a wiper skirt or a non-elastomeric sealing element to provide an environmental barrier between the knockout plug 315 and knockout 310. The shape and configuration of the seal 330 would depend on the complementary shapes of the knockout plug 315 and knockout 310.

The knockout plug 315 is illustrated in alignment for assembly with the knockout 310. The interference surface 325 is complementary to a fitting surface 330 in the knockout 310 that cooperate to form an interference fit to detachably couple the knockout plug 315 in the knockout 310.

FIG. 3B illustrates the knockout plug 315 and seal 330 after assembly in the knockout 310. As in the embodiment illustrated in FIGS. 1A and 2, the seal 330 is positioned around a circumference of the plug-sealing surface 320 to provide an environmental barrier between interior and exterior portions of the electrical enclosure when seated on the enclosure-sealing surface 340 of the knockout 310 after assembly. The interference fit between the interference and fitting surfaces (325, 335) detachably couple the plug 315 to the electrical enclosure 300.

FIG. 4 illustrates a light fixture 400 coupled to an electrical enclosure 405 that has multiple knockouts (410, 415, 420). An electrical conduit 425 is detachably coupled to one of the knockouts 410 after its knockout plug (not shown) is removed to provide access to the interior of the electrical enclosure 405. Knockout plugs (430, 435) remain detachably coupled to their respective knockouts (415, 420) to provide an environmental barrier between interior and exterior portions of the electrical enclosure 405.

While various embodiments of the application have been described, it will be apparent to those of ordinary skill in the art that many more embodiments and implementations are possible that are within the scope of this invention.

What is claimed is:

1. An electrical fixture, comprising:
    a knockout plug having plug sealing and interference surfaces;
    an electrical enclosure having
        a fitting surface complementary to the interference surface and forming an interference fit with the interference surface;
        an enclosure-sealing surface positioned adjacent to the fitting surface;
        a pipe-fitting surface approximately coaxial with the enclosure sealing and fitting surfaces; and
    an o-ring seal seated circumferentially on the plug sealing and enclosure-sealing surfaces to form an environmental seal between the knockout plug and electrical enclosure wherein the seal provides an environmental barrier between interior and exterior portions of the electrical enclosure.

2. The fixture of claim 1, wherein the interference surface comprises:
an approximately smooth surface extending around at least a portion of a circumference of the knockout plug.

3. The fixture of claim 1, wherein the pipe-fitting surface comprises:
a tapered-threaded surface to accept a threaded portion of the conduit or pipe, when the knockout is removed.

* * * * *